H. E. ATCHISON.
POST OR TELEGRAPH AND TELEPHONE POLE.
APPLICATION FILED DEC. 15, 1910.
Reissued Feb. 14, 1911. 13,202.
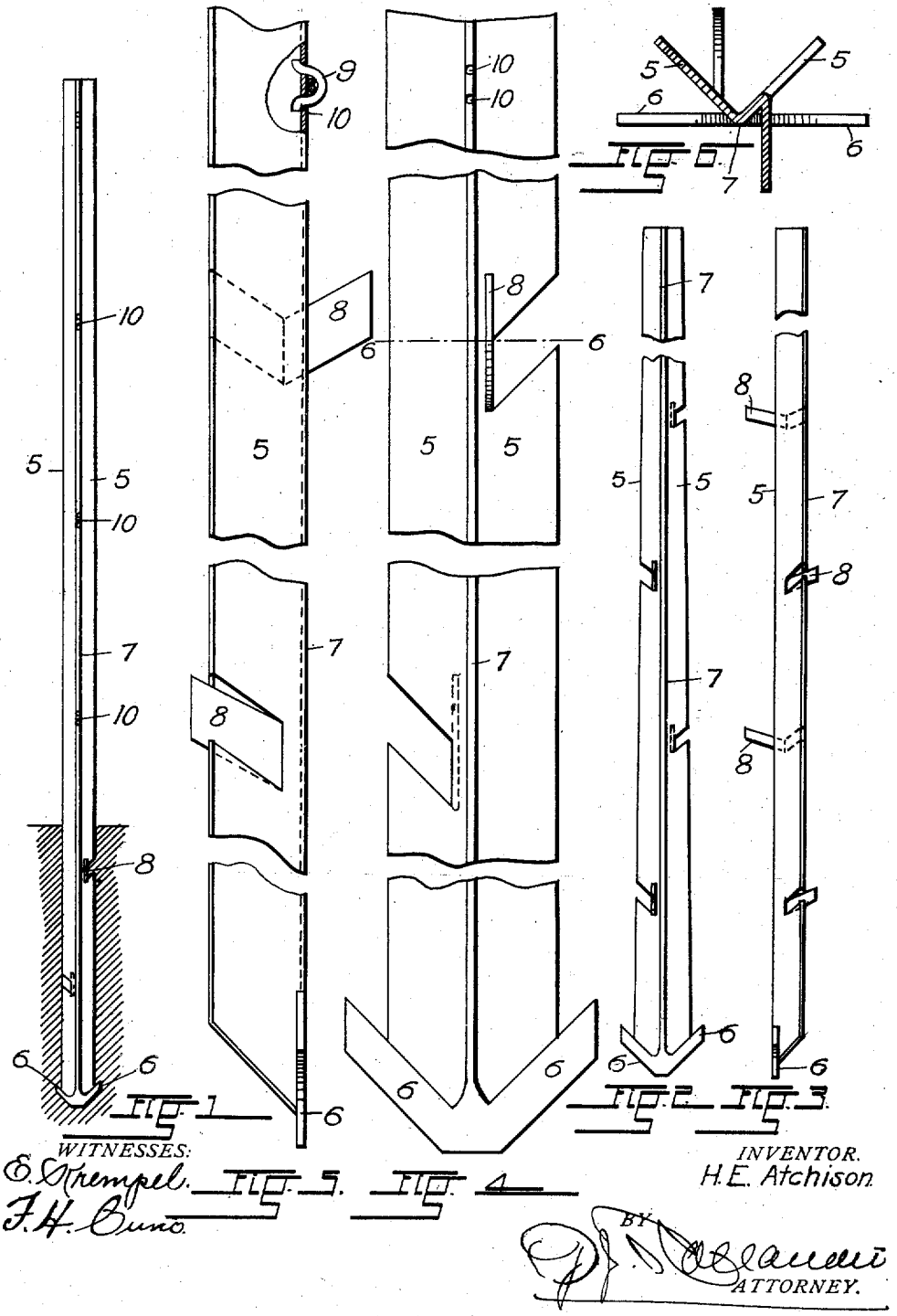
THE NORRIS PETERS CO., WASHINGTON, D. C.

UNITED STATES PATENT OFFICE.

HERBERT E. ATCHISON, OF DENVER, COLORADO, ASSIGNOR TO THE AMERICAN POST AND POLE COMPANY, A CORPORATION OF ARIZONA TERRITORY.

POST OR TELEGRAPH AND TELEPHONE POLE.

13,202. Specification of Reissued Letters Patent. Reissued Feb. 14, 1911.

Original No. 943,134, dated December 14, 1909, Serial No. 426,357. Application for reissue filed December 15, 1910. Serial No. 597,577.

*To all whom it may concern:*

Be it known that I, HERBERT E. ATCHISON, a subject of George V, King of Great Britain, residing in the city of Denver, county of Denver, and State of Colorado, have invented certain new and useful Improvements in Posts or Telegraph and Telephone Poles; and I do declare the following to be a full, clear, and exact description of the invention, such as will enable others skilled in the art to which it appertains to make and use same, reference being had to the accompanying drawings, and to the figures of reference marked thereon, which form a part of this specification.

My invention relates to certain new and useful improvements in posts and poles employed to support fence and electric wires and it has for its object to provide an article of the class named which combines simplicity of construction with durability and practicability in use and which, by its peculiar construction, is eminently adapted to withstand laterally or vertically acting strains and to be fixed firmly in an upright position without the aid of braces and the like.

I attain these objects by the means illustrated in the accompanying drawings, in the various views of which like parts are similarly designated and in which—

Figure 1— represents a front view of the improved fence post, Fig. 2— a similar, fragmentary view of a telephone or telegraph pole, Fig. 3— a side view thereof, Fig. 4— an enlarged fragmentary view of the lower portion of the post shown in Fig. 1, Fig. 5— a side view thereof, and Fig. 6— a transverse section taken along the line 6—6, Fig. 4.

The pole or post as illustrated in the drawings consists of a metallic angle bar, whose intersecting sides 5 extend substantially at right angles to each other. The pole or post is provided, at its lower extremity, with two oppositely and upwardly projecting flukes 6 which are formed by obliquely incising the sides 5 and bending the lower portions forwardly until they extend in a vertical plane with the vertex 7 of the bar.

Auxiliary anchoring means are provided by a plurality of prongs 8 which are formed at regular intervals by cutting the sides 5 along oblique, parallel lines and bending the intermediate portion parallelly to the bisector of the angle of the said sides and at right angles to the flukes.

The upwardly projecting prongs thus produced, are bent alternately inwardly and outwardly and coact with the flukes at the lower end of the post or pole to firmly maintain the latter in an upright position in the ground into which it is driven, when subjected to laterally or vertically acting forces.

The wires which compose the fence of which the posts form part, may be secured to the latter by any suitable means but I preferably employ staples 9, shown in Fig. 5, the points of which are inserted through two apertures 10 formed in the line of intersection of the two sides 5, and clenched against the crotch of the bar.

The cross bars used to support electric wires may be secured to the pole illustrated in Figs. 2 and 3 by similar or other means which, for obvious reasons, have been omitted from the drawings.

The pole or post may be of uniform width as shown in Fig. 1 or it may taper as in the form illustrated in Fig. 2 it may be cast, drawn or made of sheet metal and although the method hereinbefore described is preferable by reason of its simplicity, I wish it understood that their arrangement and construction may be modified within the spirit of my invention.

What I desire to secure by Letters Patent is:—

1. An article of the class described comprising a bar having angularly disposed sides and flukes projecting upwardly from its lower extremity, substantially in a plane with the vertex of the angle.

2. An article of the class described comprising a bar having angularly disposed sides and flukes projecting from its lower extremity and formed by incising the said sides in proximity to their lower edges and bending the partly severed portions outwardly so as to extend in one plane approximately parallel to the longitudinal axis of the bar.

3. An article of the class described comprising a bar having angularly disposed sides and vertically successive prongs projecting therefrom alternately in opposite directions and in planes substantially parallel to the longitudinal axis of the bar.

4. An article of the class described comprising a bar having angularly disposed sides and vertically successive prongs projecting upwardly therefrom in planes substantially parallel to the longitudinal axis of the bar.

5. An article of the class described comprising a bar having angularly disposed sides and vertically successive prongs projecting therefrom and formed by cutting the said sides along spaced lines and bending the intermediate portions so as to extend in planes substantially parallel to the longitudinal axis of the bar.

6. An article of the class named comprising a bar having angularly disposed sides, integral flukes projecting upwardly and oppositely from its lower extremity and vertically successive prongs projecting upwardly from the said sides at substantially right angles to the said flukes.

In testimony whereof I affix my signature in presence of two witnesses.

HERBERT E. ATCHISON.

Witnesses:

G. J. Rollandet,

E. Krempel.